United States Patent
Choi et al.

(10) Patent No.: US 11,773,223 B2
(45) Date of Patent: *Oct. 3, 2023

(54) BLOCK COPOLYMER

(71) Applicant: LG CHEM, LTD., Seoul (KR)

(72) Inventors: Jung Yun Choi, Daejeon (KR); Hye Ok Kang, Daejeon (KR); Donggyun Kang, Daejeon (KR); Younghyun Cho, Daejeon (KR); Jae Hyung Kim, Daejeon (KR); Chul Woong Kim, Daejeon (KR); In Young Huh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,698

(22) Filed: Apr. 29, 2022

(65) Prior Publication Data

US 2022/0259383 A1    Aug. 18, 2022

Related U.S. Application Data

(63) Continuation of application No. 16/615,625, filed as application No. PCT/KR2018/016992 on Dec. 31, 2018, now Pat. No. 11,359,057.

(30) Foreign Application Priority Data

Jan. 5, 2018    (KR) .................. 10-2018-0001716

(51) Int. Cl.
| | | |
|---|---|---|
| C08G 81/02 | (2006.01) | |
| C08G 18/28 | (2006.01) | |
| C08G 18/60 | (2006.01) | |
| C08G 18/73 | (2006.01) | |

(52) U.S. Cl.
CPC ......... *C08G 81/027* (2013.01); *C08G 18/281* (2013.01); *C08G 18/606* (2013.01); *C08G 18/73* (2013.01)

(58) Field of Classification Search
CPC .................................................... C08G 81/027
See application file for complete search history.

(56) References Cited

U.S. PATENT DOCUMENTS

| | | | |
|---|---|---|---|
| 11,359,057 B2* | 6/2022 | Choi | .................. C08G 63/912 |
| 2002/0161134 A1 | 10/2002 | Kim et al. | |
| 2004/0068059 A1 | 4/2004 | Katayama et al. | |
| 2006/0182710 A1 | 8/2006 | Hsieu et al. | |

(Continued)

FOREIGN PATENT DOCUMENTS

| | | |
|---|---|---|
| CN | 1662582 | 8/2005 |
| CN | 1775827 | 5/2006 |

(Continued)

OTHER PUBLICATIONS

Kricheldorf et al., "Stereocomplexes of A-B-A Triblock Copolymers Based on Poly(L-Lactide) and Poly(D-Lactide) A Blocks," Macromolecules 38:7018-7025 (2005).

(Continued)

*Primary Examiner* — Michael F Pepitone
(74) *Attorney, Agent, or Firm* — Bryan Cave Leighton Paisner LLP

(57) ABSTRACT

Provided is a lactic acid-based block copolymer which is biodegradable while having excellent mechanical properties.

10 Claims, 2 Drawing Sheets

(56) References Cited

U.S. PATENT DOCUMENTS

| | | |
|---|---|---|
| 2008/0221265 A1 | 9/2008 | Sodergard et al. |
| 2010/0222545 A1 | 9/2010 | Park et al. |
| 2011/0046339 A1 | 2/2011 | Park et al. |
| 2012/0045801 A1 | 2/2012 | Yang et al. |
| 2012/0095169 A1 | 4/2012 | Ogawa et al. |
| 2012/0270979 A1 | 10/2012 | Hsu et al. |
| 2013/0184429 A1* | 7/2013 | Pugh ............... C08G 63/06 528/274 |
| 2013/0197186 A1 | 8/2013 | Nagano et al. |
| 2013/0281633 A1 | 10/2013 | Allen |
| 2014/0205638 A1 | 7/2014 | Oh et al. |
| 2016/0208039 A1 | 7/2016 | Yoon et al. |
| 2020/0172680 A1 | 6/2020 | Choi et al. |
| 2020/0270649 A1 | 8/2020 | Kang et al. |
| 2021/0309800 A1 | 10/2021 | Choi et al. |

FOREIGN PATENT DOCUMENTS

| | | |
|---|---|---|
| CN | 1927911 A | 3/2007 |
| CN | 101616954 | 12/2009 |
| CN | 102199271 | 9/2011 |
| CN | 1023077988 | 1/2012 |
| CN | 102459391 | 5/2012 |
| CN | 105593256 | 5/2016 |
| CN | 108250415 | 7/2018 |
| EP | 2719715 A2 | 4/2014 |
| EP | 2982714 A1 | 2/2016 |
| JP | S59-06268 A | 4/1984 |
| JP | S62-131019 | 6/1987 |
| JP | S62121019 | 6/1987 |
| JP | H07-90072 | 4/1995 |
| JP | H07316271 | 12/1995 |
| JP | H09-20857 A | 1/1997 |
| JP | H11-130847 | 5/1999 |
| JP | 2001-261838 | 9/2001 |
| JP | 2002-2293986 | 10/2002 |
| JP | 2002338673 | 11/2002 |
| JP | 2003-165833 | 6/2003 |
| JP | 3504704 | 3/2004 |
| JP | 2005-527678 | 9/2005 |
| JP | 2006-124595 | 5/2006 |
| JP | 2006-183042 | 7/2006 |
| JP | 2006-188699 | 7/2006 |
| JP | 2006-206905 | 8/2006 |
| JP | 2009001637 | 1/2009 |
| JP | 2009-120802 | 6/2009 |
| JP | 2010-510371 | 4/2010 |
| JP | 2010-0510372 | 4/2010 |
| JP | 4596810 | 12/2010 |
| JP | 2013-189656 | 9/2013 |
| JP | 2014-070195 | 4/2014 |
| JP | 2014-512438 | 5/2014 |
| JP | 2017-129856 | 7/2017 |
| JP | 2020-518696 | 6/2020 |
| JP | 2020-536546 | 12/2020 |
| JP | 2021-529230 | 10/2021 |
| KR | 10-2003-0068162 | 8/2003 |
| KR | 10-2005-0024295 | 3/2005 |
| KR | 10-2008-0046795 | 5/2008 |
| KR | 1020090090695 A | 8/2009 |
| KR | 1020130034997 A | 4/2013 |
| KR | 101318734 B1 | 10/2013 |
| KR | 10-2014-009138 | 1/2014 |
| KR | 10-2014-0035882 | 3/2014 |
| KR | 10-1427459 B1 | 8/2014 |
| KR | 1020150063367 A | 6/2015 |
| KR | 10-2015-0140166 | 12/2015 |
| KR | 1020180072481 A | 6/2018 |
| WO | 2012020992 | 2/2012 |

OTHER PUBLICATIONS

Ke et al., "Synthetic routes to degradable copolymers deriving from the biosynthetized polyhydroxylalkanoates: A mini review." eXPRESS Polymer Letters 10(1): 36-53 (2016).

Liu et al., "Preparation of Higher Molecular Weight Poly (L-lactic Acid) by Chain Extension," International Journal of Polymer Science, vol. 2013, Article ID 315917, 6 pages (2013).

Ren et al., "Microbial synthesis of a novel terpolyester P(LA-co-3HB-co-3HP) from low cost substrates," Microbial Biotechnology 10(2): 371-380 (2017).

MacDonald et al., "Tuning thermal properties and microphase separation in aliphatic polyester ABA copolymers," Polym. Chem. 6: 1445-1453 (2015).

Lebarbe et al., "Fully bio-based poly(L-lactide)-b-poly(ricinoleic acid)-b-poly(L-lactide) triblock copolyesters: investigation of solid-state morphology and thermo-mechanical properties," Polym. Chem. 4: 3357-3369 (2013).

Ramier et al., "Microwave-Assisted Synthesis and Characterization of Biodegradable Block copolyesters Based on Poly(3-hydroxyalkanoate)s and Poly(D,L-lactide)," J.Polym Chem 50: 1445-1455 (2012).

Wu et al., Synthesis, characterization and biocompatibility of novel biodegradable poly[((R)-3-hydroxybutyrate)-block-(D,L-lactide)-block-(epsilon-caprolactone)] triblock copolymers, Polym Int, 57: 939-949 (2008).

Haynes et al., In Situ Copolyesters Containing Poly(L-lactide) and Poly(hydroxyalkanoate) Units, Biomacromolecules 8: 1131-1137 (2007).

Zeng et al., "Poly(L-lactic acid)-block-poly(butylene succinate-co-butylene adipate) Multiblock Copolymers: From Synthesis to Thermo Mechanical Properties," Ind. Eng. Chem. Res. 53: 3550-3558 (2014).

Pitet, L.M and Hillmyer, M.A , "Combining Ring-Opening Metathesis Polymerization and Cyclic Ester Ring-Opening Polymerization to form ABA Triblock Copolymers from 1,5-Cyclooctadiene and D,L-Lactide," Macromolecules 42: 3674-3680 (2009).

Masutani, K. and Kimura, Y., "PLA Synthesis. From the Monomer to the Polymer." RSC Polymer Chemistry Series No. 12: Chapter 1, pp. 3-36 (2015).

Andreeben, B. and Steinbuchel, A., "Biosynthesis and Biodegradation of 3-Hydroxypropionate-Containing Polyesters," Applied and Environmental Microbiology 76(15): 4919-4925 (2010).

Masutani, K and Kimura,Y., "PLA Synthesis. From the Monomer to the Polymer," RSC Polymer Chemistry Series No. 12, "PLA Synthesis and Polymerization," Chapter 1, pp. 3-26 (2014).

S. Hiki et al., "Synthesis and characterization of hydroxy-terminated [RS]-poly(3-hydroxybutyrate) and its utilization to block copolymerization with L-lactide to obtain a biodegradable thermoplastic elastomer", Polymer, 41 (2000) 7369-7379.

\* cited by examiner

BLOCK COPOLYMER

CROSS-REFERENCE TO RELATED APPLICATION(S)

This application is a continuation of U.S. patent application Ser. No. 16/615,625, filed Nov. 21, 2019, and issued as U.S. Pat. No. 11,359,057 on Jun. 14, 2022, which is the National Stage Application of International Application No. PCT/KR2018/016992, filed on Dec. 31, 2018, which claims priority to Korean Patent Application No. 10-2018-0001716, filed on Jan. 5, 2018, the disclosures of each of which are hereby incorporated by reference herein in their entirety.

FIELD OF THE INVENTION

Technical Field

The present invention relates to a block copolymer which is biodegradable, while having excellent mechanical properties.

Background of the Invention

A polylactic acid (PLA) resin is a plant-derived resin obtained from plants such as corn, etc., and has a biodegradable property. It suppresses depletion of petroleum-based resources and emits less carbon dioxide gas, unlike existing petroleum-based resins, such as a polystyrene resin, a polyvinyl chloride (PVC) resin, a polyethylene resin, etc., and thus reduces environmental pollution which is a disadvantage of petroleum-based plastic products. As environmental pollution caused by waste plastics and the like has caused social problems, efforts have been made to expand the application of polylactic acid to various fields, including food packing materials and containers, cases for electronic products, etc., to which general plastics (petroleum-based resins) have been applied.

However, the polylactic acid resin has poor impact resistance and heat resistance as compared with existing petroleum-based resins, and thus is used in limited applications. Further, the polylactic acid resin exhibits brittleness due to poor elongation at break, which is a limitation in a general-use resin.

Accordingly, in the existing technology, studies for improvement of the physical properties have been conducted by compounding polylactic acid with a material having biodegradability and relatively excellent elongation at break, such as PBS (poly(butylene succinate)) and PBAT (poly(butylene adipate-co-terephthalate)), or by forming a block copolymer therefrom. However, since PBS and PBAT have low tensile strength, there is a problem in that the compound or the block copolymer also has low tensile strength.

SUMMARY OF THE INVENTION

Technical Problem

The present invention provides a lactic acid-based block copolymer having excellent mechanical properties such as tensile strength and elongation at break while maintaining environmental friendliness and biodegradability.

Technical Solution

According to one embodiment of the present invention, a block copolymer of the following Chemical Formula 1 is provided:

[Chemical Formula 1]

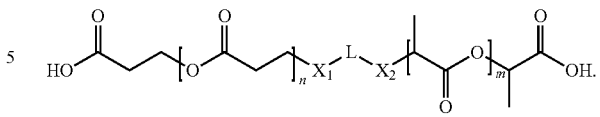

In Chemical Formula 1:
$X_1$ and $X_2$ are each independently an ester bond, an amide bond, a urethane bond, a urea bond, or a carbonate bond;
L is a substituted or unsubstituted $C_{1-10}$ alkylene, a substituted or unsubstituted $C_{6-60}$ arylene, or a substituted or unsubstituted $C_{2-60}$ heteroarylene containing one or more heteroatoms selected from the group consisting of O, N, Si, and S; and
n and m are each independently an integer from 1 to 10,000.

Hereinafter, a block copolymer according to a specific embodiment of the present invention will be described in more detail.

In the present invention, the terms "the first", "the second", and the like are used to describe a variety of components, and these terms are merely employed to differentiate a certain component from other components.

The block copolymer according to an embodiment of the present invention can include a first block including a lactic acid-polymerized repeating unit and a second block including a 3-hydroxypropionic acid (hereinafter referred to as 3HP)-polymerized repeating unit, wherein the first block and the second block are linked to each other via an ester bond, an amide bond, a urethane bond, a urea bond, or a carbonate bond, and thus 3HP can compensate for the disadvantage of low elongation at break of a biodegradable resin containing only polylactic acid.

Specifically, the block copolymer according to an embodiment of the present invention can include a first block which is a lactic acid-polymerized repeating unit of the following Chemical Formula 3 and a second block which is a 3-HP-polymerized repeating unit of the following Chemical Formula 4:

[Chemical Formula 3]

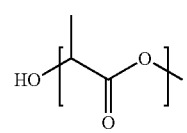

[Chemical Formula 4]

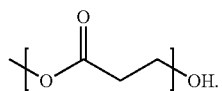

The repeating unit of Chemical Formula 3 is a repeating unit of polylactic acid (PLA), wherein any polylactic acid can be used without limitation, and commercial polylactic acid can be used. The polylactic acid can be commonly prepared from an L-lactic acid-derived monomer and/or a D-lactic acid-derived monomer, and can also include a certain amount of other monomers which are not derived from L-lactic acid or D-lactic acid. There are a variety of methods of preparing the polylactic acid. The most representative known method is ring-opening polymerization of lactide prepared from lactic acid. However, the method is not limited thereto, and the polylactic acid can also be prepared by direct polycondensation of lactic acid. The polylactic acids prepared from L-lactic acid- or D-lactic acid-derived monomers are crystalline and have a high melting point. However, when the polylactic acid is prepared using L-lactide, D-lactide, or meso-lactide derived from L-lactic acid or D-lactic acid, its crystallinity and melting point can be freely controlled according to the content of L-lactide, D-lactide, or meso-lactide, and it is possible to control the content of each component according to the application.

The repeating unit of Chemical Formula 4 is a repeating unit of poly(3-hydroxypropionic acid) (hereinafter referred to as P(3HP)), which has an advantage of high elongation at break due to excellent mechanical properties and a low glass transition temperature (Tg) of −20° C. Therefore, when the block copolymer is prepared by chemical bonding of P(3HP) and polylactic acid (PLA), it is possible to prepare a material having excellent mechanical properties and biodegradability.

The repeating units of Chemical Formulae 3 and 4 can be linked to each other via an ester bond, an amide bond, a urethane bond, a urea bond, or a carbonate bond, and specifically, $X_1$ and $X_2$ in Chemical Formula 1 can each independently be an ester bond, an amide bond, a urethane bond, a urea bond, or a carbonate bond.

Further, L in Chemical Formula 1 can be a substituted or unsubstituted $C_{1-10}$ alkylene, a substituted or unsubstituted $C_{6-60}$ arylene, or a substituted or unsubstituted $C_{2-60}$ heteroarylene containing one or more heteroatoms selected from the group consisting of O, N, Si, and S; and preferably L can be a linear $C_8$ alkylene.

In Chemical Formula 1, a ratio of n and m can be 1:1 to 10, 1:1.5 to 9, or 1:2 to 8. When a molar ratio of the first block and the second block is less than 1:1, elongation at break of the block copolymer can be reduced, and the block copolymer can be easily broken. When the molar ratio is more than 1:10, impact resistance of the block copolymer can be reduced.

The block copolymer can be a block copolymer of the following Chemical Formula 2:

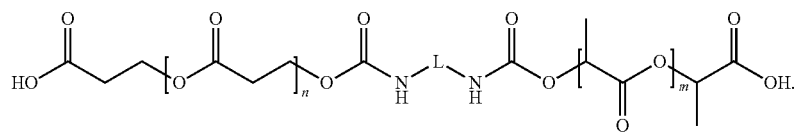

[Chemical Formula 2]

In Chemical Formula 2, L, n, and m are the same as defined above.

A weight average molecular weight of the block copolymer including the first block and the second block can be 1000 g/mol or more, 2000 g/mol to 500,000 g/mol, 5000 g/mol to 450,000 g/mol, or 10,000 g/mol to 350,000 g/mol. When the weight average molecular weight of the block copolymer is less than 1000 g/mol, elongation at break of the block copolymer can be reduced, and the block copolymer can be easily broken.

The glass transition temperature (Tg) of the block copolymer can differ according to a molar ratio of P(3HP) and PLA. When the molar ratio of P(3HP) and PLA is 1:1 to 10, the glass transition temperature can be 25° C. to 40° C., but is not limited thereto.

The block copolymer of an embodiment can have unique crystallization characteristics in DSC (Differential Scanning calorimeter) patterns. For example, the block copolymer can exhibit two peaks in DSC patterns, specifically, a first peak at a melting point (Tm) of 60° C. to 80° C., or 65° C. to 75° C., and a second peak at a melting point (Tm) of 125° C. to 150° C., or 135° C. to 148° C. From the two peaks in the above-described temperature ranges in DSC patterns, the unique crystallization characteristics of the block copolymer of an embodiment can be confirmed. The block copolymer of an embodiment having the unique crystallization characteristics can exhibit excellent heat resistance, elongation at break, impact resistance, tensile strength, etc.

The block copolymer having the unique crystallization characteristics can have tensile strength of 40 MPa to 55 MPa, 45 MPa to 55 MPa, or 50 Pa to 55 Pa. The block copolymer can have a tensile modulus of 1 GPa to 3.3 GPa, 1.5 GPa to 3.3 GPa, or 2 GPa to 3.3 GPa. The block copolymer can have elongation at break of 1.8% to 540%, 10% to 540%, or 50% to 540%.

PLA, P(3HP), and an organic solvent can be introduced into a reactor and stirred at 150° C. to 200° C., and a crosslinkable monomer additionally introduced and allowed to react. A reaction product can be dissolved in chloroform, and extracted with methanol to recover the block copolymer.

A molar ratio of PLA and P(3HP) introduced into the reactor can be 1:0.1 to 1, 1:0.3 to 0.9, or 1:0.4 to 0.7. When the molar ratio of the first block and the second block is less than 1:0.1, elongation at break of the block copolymer can be reduced, and the block copolymer can be easily broken. When the molar ratio is more than 1:1, heat resistance and impact resistance of the block copolymer can be reduced.

The crosslinkable monomer can link the respective blocks of PLA and P(3HP) to link the first block and the second block via an amide bond, and for example, the crosslinkable monomer can be a monomer containing a crosslinkable functional group such as an isocyanate group, an amide group, a hydroxyl group, a carboxyl group, an epoxy group, a glycidyl group, an amino group, an alkoxysilyl group, etc.

The crosslinkable monomer containing the isocyanate group can be, for example, 2-isocyanatoethyl (meth)acrylate, 1,1-bis(acryloyloxymethyl)ethyl isocyanate, methacryloyl isocyanate, or allyl isocyanate; an acryloyl monoisocyanate compound obtained by reacting a diisocyanate compound or a polyisocyanate compound with 2-hydroxyethyl (meth)acrylate; an acryloyl monoisocyanate compound obtained by reacting a diisocyanate or a polyisocyanate compound, a polyol compound, and 2-hydroxyethyl (meth)acrylate, etc., but is not limited thereto.

The monomer containing the amide group can be, for example, (meth)acrylamide, N-vinyl pyrrolidone, N,N-dimethyl (meth)acrylamide, N,N-diethyl (meth)acrylamide, diacetone (meth)acrylamide, etc., but is not limited thereto.

The crosslinkable monomer containing the hydroxyl group can be, for example, a monomer containing a hydroxyl group such as 2-hydroxyethyl (meth)acrylate, 2-hydroxypropyl (meth)acrylate, 4-hydroxybutyl (meth)acrylate, 6-hydroxyhexyl (meth)acrylate, hydroxyoctyl (meth)acrylate, hydroxyethylene glycol (meth)acrylate, glycerol (meth)acrylate, hydroxypropylene (meth)acrylate, etc., and a mixture of one or more of the monomers can also be used, but is not limited thereto.

The monomer containing the carboxyl group can be, for example, (meth)acrylic acid, carboxyethyl (meth)acrylate, carboxypentyl (meth)acrylate, itaconic acid, maleic acid, fumaric acid, crotonic acid, etc., but is not limited thereto.

Further, the crosslinkable monomer containing the glycidyl group can be, for example, an epoxyalkyl (meth)acrylate such as glycidyl (meth)acrylate, epoxycyclohexylmethyl (meth)acrylate, etc., but is not limited thereto.

The monomer containing the alkoxysilyl group can be, for example, 3-(trimethoxysilyl)propyl (meth)acrylate, 2-allyloxyethyl (meth)acrylate, etc., but is not limited thereto.

Advantageous Effects

According to the present invention, a lactic acid-based block copolymer having excellent mechanical properties such as tensile strength and elongation at break while maintaining environmental friendliness and biodegradability is provided.

DETAILED DESCRIPTION OF THE EMBODIMENTS

The present invention will be described in more detail in the following examples. However, the following examples are for illustrative purposes only, and the present invention is not intended to be limited by the following examples.

Example 1

To a 500 mL round-bottom flask, 11 g (number of moles: 0.055 mmol, MW: 200,000 g/mol) of polylactic acid, 2.75 g (number of moles: 0.028 mmol, MW: 100,000 g/mol) of poly(3-hydroxypropionic acid), and 50 ml of toluene were introduced, and stirred at 180° C. for 1 hour. Thereafter, 1,6-hexamethylene diisocyanate (HDI, number of moles: 0.110 mmol, MW: 168.2 g/mol) was added thereto, and allowed to react at 180° C. for 30 minutes. Thereafter, the reaction product was dissolved in chloroform, and then extracted with methanol to recover a block copolymer of the following Chemical Formula 5.

Comparative Example 1

To a 500 mL round-bottom flask, 11 g (number of moles: 0.055 mmol, MW: 200,000 g/mol) of polylactic acid and 50 ml of toluene were introduced, and stirred at 180° C. for 1 hour. To the round-bottom flask, 1,6-hexamethylene diisocyanate (HDI, number of moles: 0.110 mmol, MW: 168.2 g/mol) was added thereto, and allowed to react at 175° C. for 40 minutes under a nitrogen atmosphere. Thereafter, the reaction product was dissolved in chloroform, and then extracted with methanol to recover a copolymer of the following Chemical Formula 6.

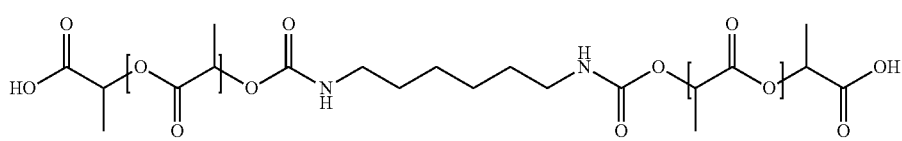

[Chemical Formula 6]

Evaluation

1) NMR (Nuclear Magnetic Resonance) Analysis

NMR analysis was performed at room temperature using an NMR spectrometer containing Varian Unity Inova (500 MHz) equipped with a 5 mm triple-resonance probe. HDI and the block copolymer of Example 1 were used as analytes after being diluted with a solvent ($CDCl_3$) for NMR measurement at a concentration of about 10 mg/ml, respectively, and chemical shifts were expressed as ppm.

Figure 1A:
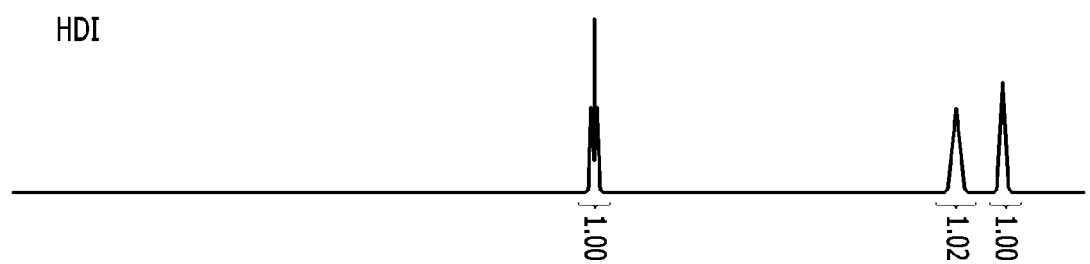
FIGS. 1A and 1B are graphs showing NMR results of analyzing HDI (FIG. 1A) and a block copolymer of Example 1, (FIG. 1B)
Figure 1B:
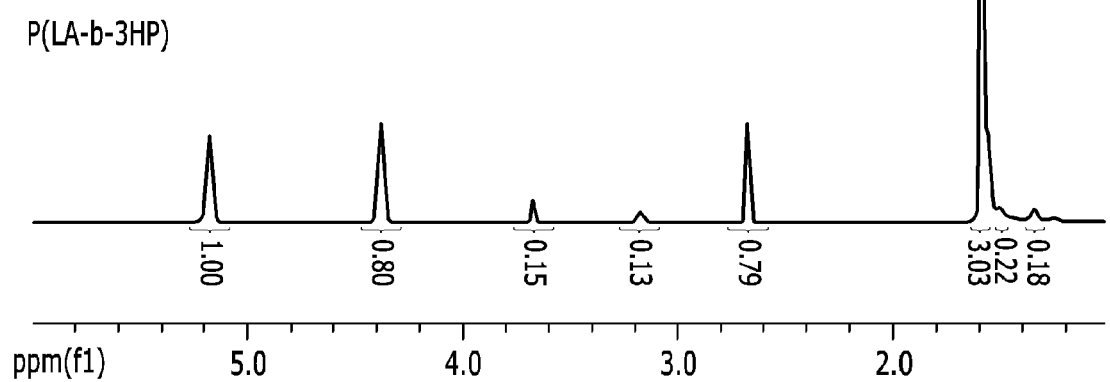

FIGS. 1A and 1B are graphs showing NMR results of analyzing HDI (FIG. 1A) and the block copolymer of Example 1 (FIG. 1B). According to FIGS. 1A and 1B, the NMR peaks of HDI were shifted to the left.

Further, according to the NMR result of the block copolymer of Example 1, a peak corresponding to the N—H bond was observed at about 3.1 ppm, indicating that the PLA block and the P3HP block were linked via a urethane bond.

2) DSC (Differential Scanning Calorimeter) Analysis

DSC analysis was performed using a PerkinElmer DSC 800 instrument. PLA, P3HP, and the block copolymer of Example 1 as analytes were heated using the instrument at a heating rate of 10° C. per minute from 25° C. to 250° C. under a nitrogen atmosphere, respectively, and then cooled at a cooling rate of –10° C. per minute from 250° C. to –50° C., and heated again at a heating rate of 10° C. per minute from –50° C. to 250° C. to obtain endothermic curves.

Figure 2:
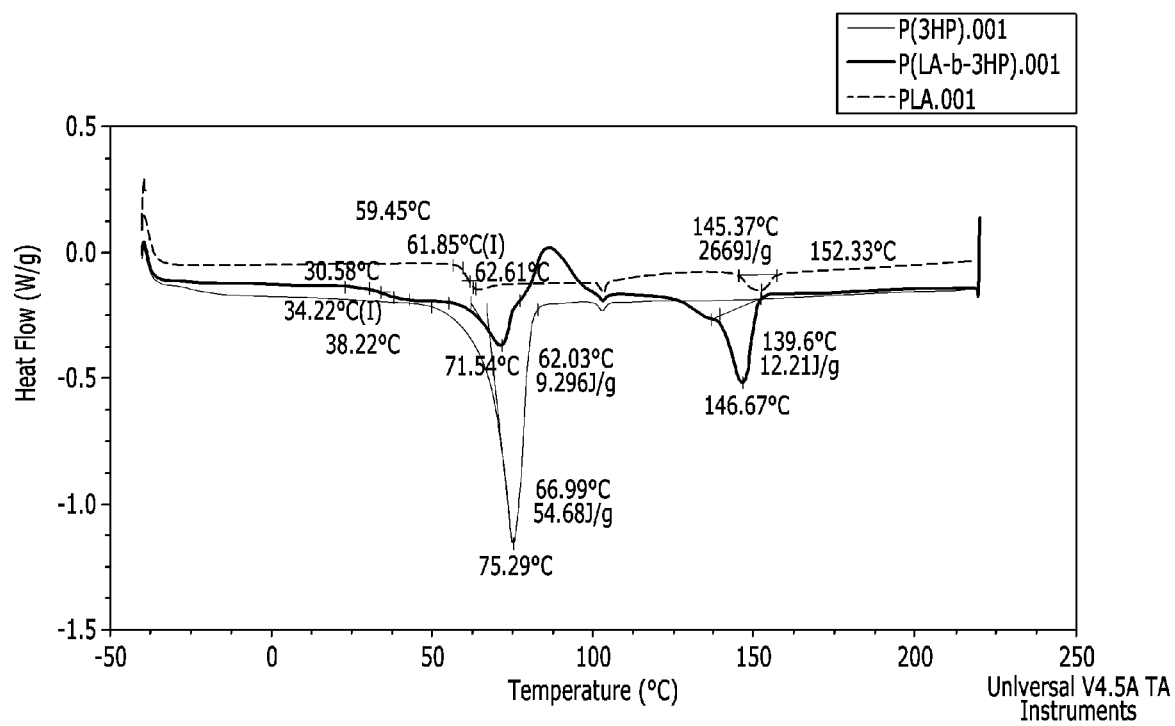
FIG. 2 is a graph showing DSC results of analyzing PLA, P3HP, and the block copolymer of Example 1.

FIG. 2 is a graph showing DSC results of analyzing PLA, P3HP, and the block copolymer of Example 1. Further, the resulting graph of FIG. 2 was analyzed to determine a glass transition temperature (Tg), a melting temperature (Tm), and an enthalpy of melting ($\Delta H_{melt}$) of each compound, which are shown in Table 1 below.

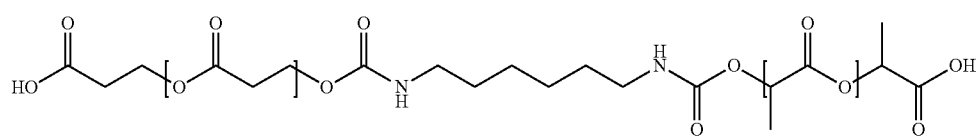

[Chemical Formula 5]

TABLE 1

|  | Tg (° C.) | Tm (° C.) | ΔH$_{melt}$ (J/g) |
| --- | --- | --- | --- |
| PLA | 61.85 | 145.37 | 2.669 |
| P3HP | −25.92 | 66.99 | 54.68 |
| Example 1 | 34.22 | 62.03 | 9.296 |
|  |  | 139.62 | 12.21 |

According to Table 1, it was confirmed that the copolymer of Example 1 showed the melting temperatures of both PLA and P3HP. Random copolymers show no crystallinity, and thus no melting temperatures are observed, whereas block copolymers show melting temperatures of respective blocks. Accordingly, the DSC analysis results confirmed that the compound of Example 1 was a block copolymer.

Further, Example 1 showed a glass transition temperature of 34.22° C. which is between the glass transition temperatures of PLA and P3HP.

What is claimed is:

1. A block copolymer, comprising a first block and a second block, wherein:
    the first block is a lactic acid-polymerized repeating unit;
    the second block is a 3-hydroxypropionic acid (3-HP)-polymerized repeating unit;
    a molar ratio of lactic acid-polymerized repeating units to 3-HP-polymerized repeating units is 1:0.1 to 1:1,
    wherein a number (m) of lactic acid-polymerized repeating units is an integer from 1 to 10,000; and a number (n) of 3-HP-polymerized repeating units is an integer from 1 to 10,000, and
    wherein a ratio of n to m is 1:2 to 1:8.

2. The block copolymer of claim 1, wherein a molar ratio of lactic acid-polymerized repeating units to 3-HP-polymerized repeating units is 1:0.3 to 1:0.9.

3. The block copolymer of claim 1, wherein a molar ratio of lactic acid-polymerized repeating units to 3-HP-polymerized repeating units is 1:0.4 to 1:0.7.

4. The block copolymer of claim 1, wherein the first block and the second block are linked to each other via an ester bond, an amide bond, a urethane bond, a urea bond, or a carbonate bond.

5. The block copolymer of claim 1, wherein:
    the first block is a lactic acid-polymerized repeating unit of the following Chemical Formula 3; and
    the second block is a 3-HP-polymerized repeating unit of the following Chemical Formula 4:

[Chemical Formula 3]

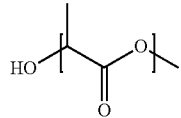

[Chemical Formula 4]

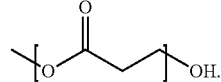

6. The block copolymer of claim 1, wherein the block copolymer has a weight average molecular weight of 1000 g/mol or more.

7. The block copolymer of claim 1, wherein the block copolymer has a first peak at a melting point (Tm) of 60° C. to 80° C. and a second peak at a melting point (Tm) of 125° C. to 150° C. in DSC (Differential Scanning Calorimeter) patterns.

8. The block copolymer of claim 1, wherein the block copolymer has an elongation at break of 50% to 540%.

9. The block copolymer of claim 8, wherein the block copolymer has:
    a) a tensile strength of 40 MPa to 55 MPa; or
    b) a tensile modulus of 1 GPa to 3.3 GPa; or
    c) both a) and b).

10. The block copolymer of claim 1, wherein the block copolymer is prepared by reacting polylactic acid and poly(3-hydroxypropionic acid) to form the block copolymer.

* * * * *